United States Patent
Schwartz et al.

(10) Patent No.: US 10,994,446 B2
(45) Date of Patent: May 4, 2021

(54) METHOD FOR THE PRODUCTION OF A PART MADE FROM A COMPOSITE MATERIAL

(71) Applicant: SAFRAN CERAMICS, Le Haillan (FR)

(72) Inventors: Mathieu Schwartz, Moissy-Cramayel (FR); Arnaud Delehouze, Moissy-Cramayel (FR); Nicolas Laval, Moissy-Cramayel (FR); Bertrand Desjoyeaux, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 110 days.

(21) Appl. No.: 16/481,199

(22) PCT Filed: Feb. 1, 2018

(86) PCT No.: PCT/FR2018/050244
§ 371 (c)(1),
(2) Date: Jul. 26, 2019

(87) PCT Pub. No.: WO2018/142080
PCT Pub. Date: Aug. 9, 2018

(65) Prior Publication Data
US 2020/0001504 A1    Jan. 2, 2020

(30) Foreign Application Priority Data
Feb. 2, 2017    (FR) ........................................ 1750866

(51) Int. Cl.
B29C 70/48    (2006.01)
B29B 11/16    (2006.01)
(Continued)

(52) U.S. Cl.
CPC ............ B29B 11/16 (2013.01); B29C 70/382 (2013.01); B29C 70/48 (2013.01); B29C 70/543 (2013.01)

(58) Field of Classification Search
CPC ....... B29B 11/16; B29C 70/382; B29C 70/48; B29C 70/543
See application file for complete search history.

(56) References Cited

U.S. PATENT DOCUMENTS 5,188,782 A    2/1993 Bittler et al.
5,439,627 A *  8/1995 De Jager ............... B22F 1/0059
                                                        264/129

(Continued)

FOREIGN PATENT DOCUMENTS

CN    1474857 A    2/2004
CN    101636367 A    1/2010
(Continued)

OTHER PUBLICATIONS

Pure Chems Material Safety Data sheets (MSDS)—Polyvinyl Alcohol, 7 pages (Year: 2020).*

(Continued)

Primary Examiner — Matthew J Daniels
Assistant Examiner — Shibin Liang
(74) Attorney, Agent, or Firm — Pillsbury Winthrop Shaw Pittman LLP

(57) ABSTRACT

A method of fabricating a composite part, includes forming a fiber preform for the part that is to be obtained by depositing a plurality of fiber structures impregnated with a thermoplastic polymer onto a surface, with deposition being performed by automated fiber placement; eliminating the thermoplastic polymer present in the preform by dissolution with a solvent; and injecting a liquid impregnation composition into the pores of the fiber preform after eliminating the (Continued)

thermoplastic polymer in order to form a matrix in the pores of the fiber preform.

13 Claims, 1 Drawing Sheet

(51) Int. Cl.
*B29C 70/38* (2006.01)
*B29C 70/54* (2006.01)

(56) References Cited

U.S. PATENT DOCUMENTS

| | | | |
|---|---|---|---|
| 7,045,083 B2* | 5/2006 | Gardner | B29C 70/443 |
| | | | 264/102 |
| 8,703,630 B2* | 4/2014 | LoFaro | B32B 7/10 |
| | | | 442/278 |
| 2004/0030061 A1 | 2/2004 | McGrail et al. | |
| 2010/0086679 A1 | 4/2010 | Jehl et al. | |
| 2013/0149491 A1 | 6/2013 | Wakeman et al. | |

FOREIGN PATENT DOCUMENTS

| | | |
|---|---|---|
| EP | 1 472 060 A1 | 11/2004 |
| FR | 3 033 729 A1 | 9/2016 |
| WO | WO 03/059592 A1 | 7/2003 |
| WO | WO 2016/003763 A2 | 1/2016 |

OTHER PUBLICATIONS

International Search Report as issued in International Patent Application No. PCT/FR2018/050244, dated Jun. 20, 2018.

\* cited by examiner

METHOD FOR THE PRODUCTION OF A PART MADE FROM A COMPOSITE MATERIAL

CROSS-REFERENCE TO RELATED APPLICATIONS

This application is the U.S. National Stage of PCT/FR2018/050244, filed Feb. 1, 2018, which in turn claims priority to French patent application number 1750866 filed Feb. 2, 2017. The content of these applications are incorporated herein by reference in their entireties.

BACKGROUND OF THE INVENTION

The invention relates to a method of fabricating a composite material part using a technique of automated fiber placement (AFP).

It is known to make composite material parts by draping pre-impregnated fiber reinforcement in the form of plies. In certain present techniques, the draping is performed manually by an operator. Those techniques can give rise to production costs for parts that are relatively high and to risks of error in the positioning of the plies. That leads to a degree of variability in the mechanical performance of the parts that are obtained, and also to parts having mechanical properties that could be improved.

Other solutions have been developed, such as the automated fiber placement technique. That mechanical technique presents an advantage of reducing the cost of producing parts made of composite material. In the prior art, fiber plies impregnated with an aqueous suspension containing ceramic particles are draped on a surface in order to obtain a preform for the part that is to be obtained. The resulting preform is then dried, and then the ceramic particles are sintered so as to form the matrix in the pores of the preform. The mechanical performance of parts obtained by prior art automated fiber placement techniques could nevertheless be improved, in particular because of the presence of residual pores within the matrix.

Also known is U.S. Pat. No. 5,188,782, which discloses producing preforms from ceramic or metal fibers; FR 3 033 729, which discloses a fiber applicator head with an infrared heater system; EP 1 472 060, which discloses a carbon strip with a fugitive binder and an associated method of use; U.S. Pat. No. 5,439,627, which discloses a method of fabricating reinforced composites; and US 2013/0149491, which discloses a composite article fabricated from a fiber strip.

There thus exists a need for a method that makes it possible, at low production cost, to obtain composite material parts having improved mechanical properties.

OBJECT AND SUMMARY OF THE INVENTION

To this end, in a first aspect, the invention provides a method of fabricating a composite part, the method comprising the following steps:
 forming a fiber preform for the part that is to be obtained by depositing a plurality of fiber structures impregnated with a thermoplastic polymer onto a surface, with deposition being performed by automated fiber placement;
 eliminating the thermoplastic polymer present in the preform by dissolution with a solvent; and
 injecting a liquid impregnation composition into the pores of the fiber preform after eliminating the thermoplastic polymer in order to form a matrix in the pores of the fiber preform.

For reasons of concision, the automated fiber placement technique is referred to below as the "AFP technique".

The thermoplastic polymer coating all or part of the fibers of the fiber structure imparts cohesion thereto and an adhesive ability that are sufficient and compatible with making a fiber preform by the AFP technique. In the invention, the thermoplastic polymer is used as a fugitive binder that is useful for constructing the preform, but that is subsequently eliminated without leaving any harmful residue prior to forming the matrix. This elimination can release the pores in the preform so as to make it possible by injection to introduce the material(s) for forming the matrix into the pores between and within the fibers. The method of the invention differs from prior art AFP techniques in that the ingredient(s) for forming the matrix is/are not delivered together with the fibers while forming the preform, but on the contrary is/are delivered by injecting an impregnation composition after the steps of forming the preform and of eliminating the thermoplastic polymer. Delivering the matrix by this injection technique serves advantageously to improve the quality of the matrix that is formed, by considerably reducing the volume of the macropores compared with prior art AFP techniques, in which macropore formation is inherent to the technique of draping layers that are pre-impregnated with the ingredients of the matrix. The invention thus makes it possible, at reduced production cost, to fabricate composite material parts having mechanical properties that are improved, thereby making it possible in particular to obtain lighter elements made out of such parts while conserving the desired mechanical performance.

In an implementation, the thermoplastic polymer has a glass transition temperature higher than or equal to 50° C.

Such a characteristic contributes to improving stability over time in the fibers impregnated by the thermoplastic polymer and to limiting the stickiness of the fibers at ambient temperature (20° C.), thereby making them easier to store prior to being deposited by the AFP technique and making them easier to deliver to the presser element of the AFP deposition head.

In an implementation, the thermoplastic polymer has a melting temperature higher than or equal to 50° C., e.g. lying in the range 50° C. to 250° C., or indeed in the range 150° C. to 200° C.

Such a characteristic contributes to limiting the stickiness of the fibers at ambient temperature, thereby making them easier to store prior to being deposited by the AFP technique and making them easier to deliver into the deposition head. The desired adhesive ability can then be obtained by heating during deposition by the AFP technique in order to soften or indeed melt the thermoplastic polymer.

In an implementation, the thermoplastic polymer is selected from: polyalkylene carbonates; polyesters; polymethyl methacrylate (PMMA); polyvinyl alcohol (PVA); polyvinylpyrrolidone (PVP); polyethylene glycols (PEGs); maltodextrins; cellulose polymers; waxes; and mixtures thereof.

In an implementation, the thermoplastic polymer is hydrosoluble. The solvent is then aqueous. In particular, the hydrosoluble thermoplastic polymer may be selected from: polyvinyl alcohol (PVA), polyvinylpyrrolidone (PVP), polyethylene glycols (PEGs), and mixtures thereof. The solvent may be water, for example at a temperature higher than or equal to 60° C., or indeed lying in the range 60° C. to 90° C. Whatever its chemical nature, the solvent may be liquid.

In an implementation, the fiber structures are made of oxide or non-oxide ceramic fibers, of glass fibers, of metal fibers, of polymer fibers such as aramid fibers (Kevlar®), of boron fibers, or of carbon fibers, or of a mixture of such fibers.

In an implementation, the matrix is obtained after heating the impregnation composition injected into the pores of the fiber preform.

Under such circumstances, the impregnation composition may comprise a suspension of a plurality of ceramic particles and the matrix may be formed by sintering the particles.

In a variant, the impregnation composition may comprise a resin and the matrix may be formed by curing the resin or by curing and then pyrolyzing the resin.

In an implementation, the matrix is formed by injecting a molten metal composition into the pores of the preform.

The matrix may be made in part, or indeed entirely, out of ceramic materials. In a variant, the matrix may comprise at least one carbon phase and at least one phase of a ceramic material. The ceramic material forming all or part of the matrix may be an oxide material, such as alumina, or a non-oxide material, such as silicon carbide. When the matrix comprises a ceramic oxide material, the fiber structures may be formed by ceramic oxide fibers, such as alumina fibers or aluminosilicate fibers or a mixture of such fibers. When the matrix comprises a ceramic material that is not an oxide, the fiber structures may be made of carbon fibers or of fibers of a ceramic material that is not an oxide, or of a mixture of such fibers.

The invention also applies when the matrix is made entirely out of carbon. Matrices of this type may be obtained by injecting a carbon precursor resin, such as a phenolic or a furanic resin, and then pyrolyzing the resin.

In another variant, the resulting matrix may be an organic matrix. An organic matrix may be formed by injecting a resin and curing the resin. When the matrix is organic, the fiber structures may be made of carbon fibers, of glass fibers, of polymer fibers, of boron fibers, or of metal fibers, or of a mixture of such fibers.

BRIEF DESCRIPTION OF THE DRAWING

Other characteristics and advantages of the invention appear from the following description of particular implementations of the invention given as non-limiting examples and with reference to the accompanying drawing, in which.

DETAILED DESCRIPTION OF IMPLEMENTATIONS

Figure 1:
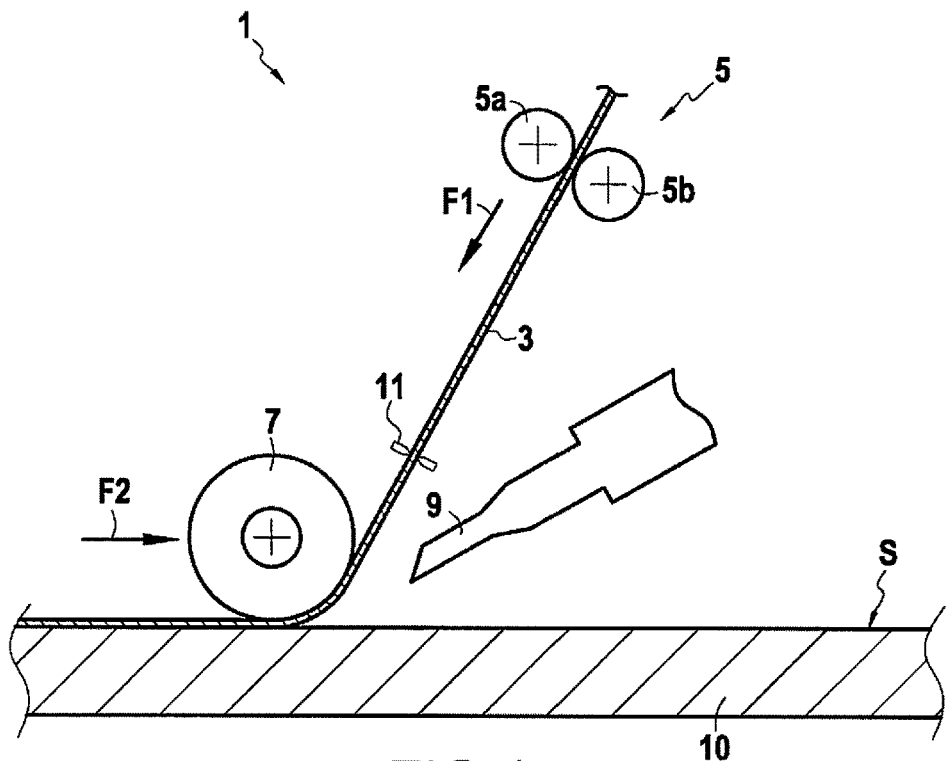
FIG. 1 is a fragmentary diagram showing a fiber preform being formed by automated fiber placement in the context of an example method of the invention.

FIG. 1 shows in diagrammatic and fragmentary manner a fiber preform being made by automated fiber placement in the context of an example method of the invention. The resulting fiber preform is for constituting the fiber reinforcement of the part that is to be obtained.

FIG. 1 shows diagrammatically the structure of a deposition head 1 of a device for performing an AFP technique. The structure of the deposition head 1 that is shown is itself known. The deposition head 1 is fed with a fiber strip 3 impregnated with thermoplastic polymer for the purpose of making the fiber preform.

The fiber strip may be impregnated beforehand with the thermoplastic polymer by using any conventional technique, e.g. by dipping, by applying the polymer with a roller, or indeed by spraying the polymer. The strip may be impregnated with the thermoplastic polymer prior to performing the AFP technique, in which case it may be stored until the method is performed. In a variant, the strip is impregnated in line with the deposition head 1 upstream therefrom and is then delivered directly to the deposition head 1 for forming the preform by the AFP technique.

The thermoplastic polymer impregnating the fiber strip 3 may be hydrosoluble, as mentioned above. This hydrosoluble nature enables the polymer to be dissolved by being put into contact with an aqueous medium at a temperature greater than or equal to 20° C., or indeed 50° C. Nevertheless, the thermoplastic polymer need not be hydrosoluble, in which case an organic solvent is used in order to perform the eliminating step after forming the fiber preform.

As mentioned above, the thermoplastic polymer may present a glass transition temperature that is higher than or equal to 50° C., e.g. lying in the range 50° C. to 120° C., e.g. in the range 60° C. to 80° C., or indeed 60° C. to 70° C. The glass transition temperature may be determined by differential scanning calorimetry (DSC).

The melting temperature of the thermoplastic polymer may lie in the range 50° C. to 250° C., or in the range 150° C. to 200° C. The melting temperature may be measured by DSC.

The fiber preform is formed on the surface S of a support 10. For this purpose, the deposition head 1 is fed with the fiber strip 3 impregnated with the thermoplastic polymer. The impregnated strip 3 is taken by a conveyor element 5 to a presser element 7 for applying pressure that is situated beside the surface S. In this example, the conveyor element 5 is in the form of a pair of contrarotating rollers 5a and 5b between which the strip 3 passes. The conveyor element 5 serves to cause the impregnated strip 3 to advance until it reaches the pressure element 7 along the direction represented by arrow F1.

The presser element 7 applies pressure to the impregnated strip 3 so as to deposit it on the surface S. In this example, the presser element 7 is in the form of a roller. The deposition head 1 may also include a heater element 9 situated in the vicinity of the presser element 7. Where necessary, the heater element 9 serves to heat the impregnated strip 3 while it is being deposited so as to fluidify the thermoplastic polymer and thereby impart the desired adhesive ability to the deposited strip. By way of example, the heater element 9 may cause the impregnated strip 3 present on the presser element 7 to take up a temperature higher than or equal to 50° C. During deposition, the thermoplastic polymer may be in the softened state, i.e. the polymer may be subjected to heating to a temperature that is higher than its softening point. During deposition, the thermoplastic polymer may thus be in the melted state or in the pasty state.

During deposition, the deposition head 1 is movable in order to apply the impregnated strip 3 onto a determined first zone of the surface S (arrow F2). Once application has taken place on the first zone, the cutter element 11 of the deposition head 1 cuts the impregnated strip 3. After cutting, a first impregnated fiber structure formed by a first segment of the strip 3 has thus been deposited on the first zone of the surface S. Initially, prior to depositing the first fiber structure, an initial layer of a thermoplastic material may be deposited on the first zone of the surface S and the first fiber structure may subsequently be deposited on that layer of thermoplastic material. Depositing this initial thermoplastic layer is optional.

Thereafter, formation of the preform is continued by advancing the impregnated strip 3 in the deposition head 1 until it reaches the presser element 7 by actuating the conveyor element 5. The deposition head 1 may be moved so as to deposit the strip 3 on a second zone of the surface S that is distinct from the first zone. A second impregnated fiber structure formed by a second segment of the strip 3 is thus deposited on the second zone of the surface S in a manner similar to that described above.

Making of the preform is then continued by depositing one or more other impregnated fiber structures in the same manner as described above.

As mentioned above, various materials may be envisaged for constituting the fibers of fiber structures. In particular, the fiber structures may be made of ceramic fibers or of carbon fibers. Ceramic fibers may be fibers of non-oxide material, such as silicone carbide SiC, or of oxide material, such as alumina. In an implementation, the fibers used may be SiC fibers supplied under the name "Nicalon", "Hi-Nicalon", or "Hi-Nicalon-S" by the Japanese supplier Nippon Carbon, or "Tyranno SA3" by the supplier UBE. It is also possible to use alumina fibers supplied under the name "Nextel" by the supplier 3M. Fibers supplied under the name "Torayca T300" by the supplier Toray also constitute examples of carbon fibers that are suitable for use.

The deposited fiber structures may be in the form of fiber roving or fabric plies. In particular, the deposited fiber structures may be free from any powder composition. In particular, the thermoplastic polymer impregnating these structures need not include any solid fillers. The deposited fiber structures may be impregnated solely with an organic phase comprising the thermoplastic polymer. The fiber structures thus need not be impregnated with a liquid aqueous phase while they are being deposited by the AFP technique. In addition to the thermoplastic polymer, the deposited fiber structures may include a plasticizer.

In an implementation, while it is being deposited, each fiber structure presents a content by weight of thermoplastic polymer that is greater than or equal to 1%, e.g. greater than or equal to 3%, or even 5%. This content by weight may for example lie in the range 1% to 12%, e.g. in the range 3% to 12%, e.g. in the range 3% to 8%, e.g. in the range 5% to 8%. While being deposited, each fiber structure may be partially impregnated with the thermoplastic polymer. In other words, under such circumstances, the pores of the fiber structures are filled incompletely by the thermoplastic polymer.

The thermoplastic polymer may be selected from: polyalkylene carbonates such as polypropylene carbonate or polyethylene carbonate; polyesters, e.g. aliphatic copolyesters such as polybutylene succinate or semi-aromatic copolyesters e.g. polyethylene terephthalate or polybutylene terephthalate; polymethyl methacrylate; polyvinyl alcohol; polyvinylpyrrolidone; polyethylene glycols; maltodextrins; cellulose polymers; waxes; and mixtures thereof. In particular, the thermoplastic polymer may be selected from: polyvinyl alcohol; polyvinylpyrrolidone; polyethylene glycols; and mixtures thereof.

Depending on the properties desired for the part that is to be obtained, it should also be observed that, the fibers of the fiber strip 3 may themselves be coated by a coating of ceramic material or of carbon material, prior to being impregnated with the thermoplastic polymer.

Thus, the fibers may be coated by an interphase. The interphase may comprise a single layer or multiple layers. The interphase may comprise at least one layer of pyrolytic carbon (PyC), of boron nitride (BN), of silicon doped boron nitride (BN(Si), with silicon at a mass content lying in the range 5% to 40%, and the balance being boron nitride) or boron doped carbon (BC, with boron being at an atomic content lying in the range 5% to 20%, the balance being carbon). By way of example, the thickness of the interphase may lie in the range 10 nanometers (nm) to 1000 nm, e.g. in the range 10 nm to 100 nm. In this example, the interphase has an embrittlement-relief function in the resulting part, serving to deflect any cracks that might reach the interphase after propagating through the matrix, thereby preventing or delaying the fibers being broken by such cracks. The interphase may optionally be coated by an additional layer of silicon carbide, serving in particular to improve the resistance of the resulting parts to oxidation and to protect the interphase while forming the matrix. Techniques enabling the interphase and the SiC layer to be formed are themselves known and do not need to be described in greater detail herein. By way of example, it is possible to use a chemical vapor deposition or infiltration (CVD or CVI) technique for making such coatings.

The preform that is obtained after performing the AFP technique may have a single fiber layer, or in a variant it may have a stack of a plurality of fibers layers.

By way of example, preform formation may comprise depositing a first fiber layer having a first set of impregnated fiber structures. These fiber structures of the first set may optionally be in contact edge to edge. Preform formation may also include depositing a second fiber layer on the first layer, the second layer comprising a second set of impregnated fiber structures. These fiber structures of the second set may optionally be in contact edge to edge. Not depositing the fiber structures edge to edge may serve advantageously to provide additional injection channels within the preform so as to facilitate the injection step, in particular in zones of particular shapes. The fibers of the first set may extend in a common first direction (e.g. mutually parallel to one another). In similar manner, the fibers of the second set may extend in a common second direction. The second direction may be parallel to the first direction. In a variant, the second direction forms a non-zero angle with the first direction. The angle formed between the first and second directions is a function of the mechanical properties desired for the part that is to be obtained. In the particular situation where the preform comprises a single fiber layer, it may be formed by a set of impregnated fiber structures that are in contact edge to edge or that are not in contact edge to edge.

The surface S on which the impregnated fiber structures are deposited may be plane. In a variant, the surface S may be non-plane, being convex or concave. By way of example, the surface S may present a shape that is developable, such as a shape that is conical, frustoconical, or cylindrical, or it may have a shape that is not developable. While depositing impregnated structures by the AFP technique, the surface S may be stationary, or in a variant it may be moving. If it is moving, the surface S may for example be driven in rotation during deposition.

Figure 2:
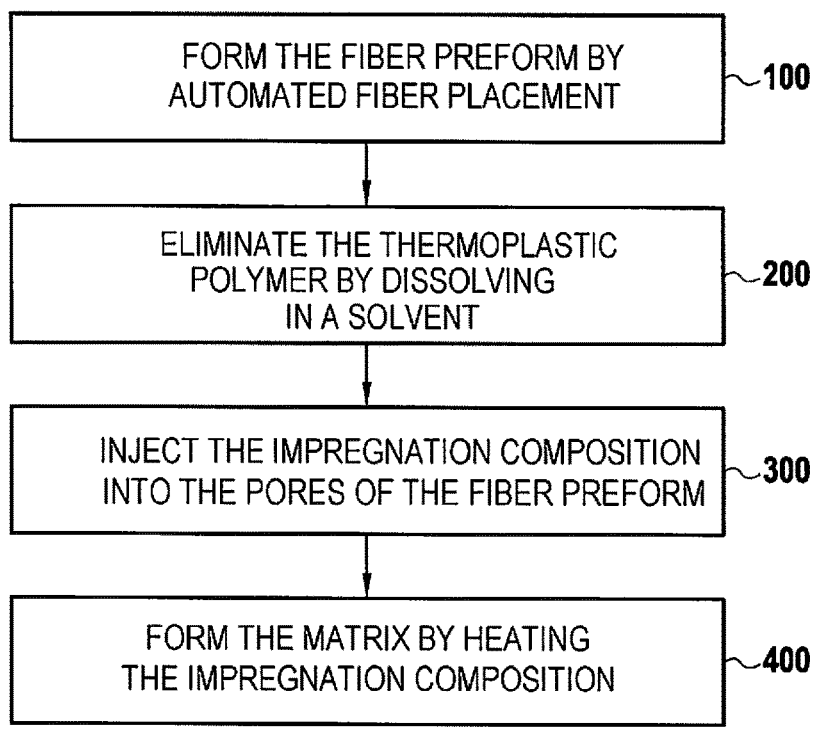
FIG. 2 is a flow chart showing a succession of steps that can be implemented in the context of a method of the invention.

FIG. 2 is a flow chart showing the various steps of an example method of the invention.

A fiber preform that is to form the fiber reinforcement of the part that is to be obtained is initially formed by the AFP technique by draping a plurality of impregnated fiber structures on a surface, as described above (step 100).

Once the preform has been obtained on the support, it is possible to position a wall or a backing shape on the support carrying the preform. The support and the wall as positioned in this way define a treatment chamber in which the preform is present. One or more injection ports and at least one outlet orifice may be provided in the wall and open out into the treatment chamber.

Thereafter, the thermoplastic polymer is eliminated by injecting a solvent into the injection port(s) and removing the solvent via the outlet orifice (step 200). The thermoplastic polymer is eliminated as a result of coming into contact with the solvent. The solvent may be liquid, or in a variant the solvent may be a gas. The solvent is selected as a function of the chemical nature of the thermoplastic polymer in order to dissolve it. By way of example, it is possible to use water at a temperature higher than or equal to 50° C. for eliminating polyvinyl alcohol or polyvinylpyrrolidone. In a variant, it is possible to use an organic solvent, such as ethylene acetate, which can be used in particular for eliminating non-hydrosoluble polymers such as polypropylene carbonate. At the end of being put into contact with the solvent, the thermoplastic polymer may be completely eliminated from the fiber preform.

Once this elimination has been achieved, it is optionally possible to dry the fiber preform and then inject the impregnation composition into the pores of the fiber preform present in the treatment chamber (step 300). Nevertheless, such drying is optional, in particular when the impregnation composition is in the form of a suspension, and the suspension can be injected directly without previously drying the fiber preform. Naturally, the materials constituting the support and the wall are selected so as to be compatible with the operating conditions used while forming the matrix.

The impregnation composition may be injected at an injection pressure higher than or equal to 1 bar. The pressure at the outlet orifice may optionally be less than 1 bar. For example, it is possible to impose a pressure lying in the range 30 millibars (mbars) to 50 mbars at the outlet orifice, and it is then possible to inject the impregnation composition without any applied pressure (i.e. at an injection pressure equal to 1 bar). In a variant, the impregnation composition may be injected under pressure, e.g. at a pressure lying in the range 3 bars to 10 bars.

The flow chart of FIG. 2 relates to a situation in which the matrix is obtained by injecting the impregnation composition into the preform and then by heating the impregnation composition (step 400). As mentioned below, performing subsequent heating after injection is optional.

In a first example, the impregnation composition may be in the form of a suspension of ceramic particles in a liquid medium. The liquid medium may be aqueous or organic. By way of example, the ceramic particles may be particles of silicon carbide, of boron carbide, of mullite, of silica, or of alumina. The suspension is injected into the pores of the fiber preform and heating is then performed. This heating comprises a first stage of drying during which the liquid medium of the suspension is evaporated, followed by a second stage in which the ceramic matrix is formed by sintering the ceramic particles.

In a second example, the impregnation composition may be in the form of a resin. After the resin has been injected, heating is performed in order to cure the resin and obtain an organic matrix. The resin may optionally be filled with particles. The particles may be ceramic particles or carbon particles, such as particles of silica or nanotubes of carbon. The particles may have a mean size (D50) that is less than or equal to 5 micrometers (µm), preferably 1 µm.

In a third example, the impregnation composition may be in the form of a resin that is a precursor of ceramic or of carbon. By way of example, the carbon precursor resin may be a phenolic resin or a furanic resin. By way of example, the ceramic precursor resin may be a polysiloxane, polysilazane, or polycarbosilane resin. Under such circumstances, after injecting the resin, it is heated in order to cure and then pyrolize the resin so as to obtain a matrix phase of ceramic or of carbon. Because of the shrinkage that occurs during this pyrolysis stage, the injection and pyrolysis process may be repeated in order to fill in any accessible pores of the fiber preform. The ceramic or carbon precursor resin may optionally be filled with ceramic or carbon particles.

Various different techniques for forming the matrix may be combined. Thus, it is possible to form a first matrix phase out of carbon by pyrolyzing a precursor resin, and then a second matrix phase out of ceramic, e.g. by sintering ceramic particles.

As mentioned above, the heating step (step 400) following injection is optional in the context of the present invention. Specifically, in a fourth example, the impregnation composition may be in the form of a molten metal composition, e.g. molten silicon or a molten silicon alloy. Under such circumstances, a powder of ceramic particles or of carbon particles may be introduced into the pores of the fiber preform prior to injecting the molten metal. Thereafter, the molten metal is injected into the pores of the fiber preform in order to obtain the matrix. In this example, the matrix may be obtained directly after injecting the molten metal composition, and possibly after cooling it (without any subsequent heating step).

The part obtained by performing the method of the invention may be a part for a nacelle or for an exhaust cone. By way of example, the part may have a structure having a core portion present between two skin portions.

The term "lying in the range . . . to . . . " should be understood as including the bounds.

The invention claimed is:

1. A method of fabricating a composite part, the method comprising:
    forming a fiber preform for the part that is to be obtained by depositing a plurality of fiber structures impregnated with a thermoplastic polymer onto a surface, with deposition being performed by automated fiber placement;
    eliminating the thermoplastic polymer present in the preform by dissolution with a solvent; and
    injecting a liquid impregnation composition into the pores of the fiber preform after eliminating the thermoplastic polymer in order to form a matrix in the pores of the fiber preform.

2. A method according to claim 1, wherein the thermoplastic polymer has a glass transition temperature higher than or equal to 50° C.

3. A method according to claim 1, wherein the thermoplastic polymer has a melting temperature higher than or equal to 50° C.

4. A method according to claim 1, wherein the thermoplastic polymer is selected from the group consisting of polyalkylene carbonates;
    polyesters; polymethyl methacrylate; polyvinyl alcohol; polyvinylpyrrolidone; polyethylene glycols; maltodextrins; cellulose polymers; waxes; and mixtures thereof.

5. A method according to claim 1, wherein the thermoplastic polymer is hydrosoluble.

6. A method according to claim 1, wherein the solvent is aqueous.

7. A method according to claim 6, wherein the solvent is water.

8. A method according to claim 1, wherein the solvent is at a temperature higher than or equal to 60° C.

9. A method according to claim 1, wherein the matrix is obtained after heating the impregnation composition injected into the pores of the fiber preform.

10. A method according to claim 9, wherein the impregnation composition comprises a suspension of a plurality of ceramic particles and wherein the matrix is formed by sintering the particles.

11. A method according to claim 9, wherein the impregnation composition comprises a resin and wherein the matrix is formed by curing the resin or by curing and then pyrolyzing the resin.

12. A method according to claim 1, wherein the matrix is formed by injecting a molten metal composition into the pores of the preform.

13. A method according to claim 1, wherein the fiber structures are formed of oxide or non-oxide ceramic fibers, of glass fibers, of metal fibers, of polymer fibers, of boron fibers, or carbon fibers, or of a mixture of such fibers.

* * * * *